United States Patent [19]
Mardinian et al.

[11] Patent Number: 5,640,004
[45] Date of Patent: Jun. 17, 1997

[54] PORTABLE OBJECT INCLUDING AN ELECTRONIC CIRCUIT POWERED BY AN INTERNAL BATTERY AND HAVING A DATA MEMORY, A METHOD AND APPARATUS FOR EXTERNALLY POWERING SAID OBJECT AND FOR TRANSFERRING DATA THEREFROM

[75] Inventors: Grégory Mardinian, Montmorency; Patrice Brice, Vincennes, both of France

[73] Assignee: Innovatron Industries, Societe, Anonyme, Paris, France

[21] Appl. No.: 562,044

[22] Filed: Nov. 22, 1995

[51] Int. Cl.$^6$ .............................. G06K 19/06; G06K 7/00
[52] U.S. Cl. ............................... 235/492; 235/487
[58] Field of Search .................... 235/492, 380, 235/382, 441, 475; 324/428, 433, 426, 427; 340/636, 661, 663; 320/13, 37, 38; 315/241 P, 241 S

[56] References Cited

FOREIGN PATENT DOCUMENTS 0602456  1/1994  Japan ........................ 235/492
0660230  3/1994  Japan ........................ 235/492

*Primary Examiner*—Donald T. Hajec
*Assistant Examiner*—Thien M. Le
*Attorney, Agent, or Firm*—Bardehle, Pagenberg, Dost, Altenburg, Frohwitter, Ceissler & Partners

[57] ABSTRACT

The portable object includes an electronic circuit powered by an internal battery and having a data memory; it enables data to be interchanged with the outside without making direct electrical contact. It comprises a pierceable zone forming a region of the housing of the object, and a plurality of contact areas inside the housing and in register with the pierceable zone, the contact areas being connected to power supply lines for the electronic circuit, the areas being suitable for being put into contact with electrically conductive spikes connected to an external power supply circuit and pushed through the pierceable zone, thereby enabling the electronic circuit of the object to be powered and thus making good any exhaustion or failure of its internal battery, in particular in order to provide access to the data memory.

11 Claims, 1 Drawing Sheet

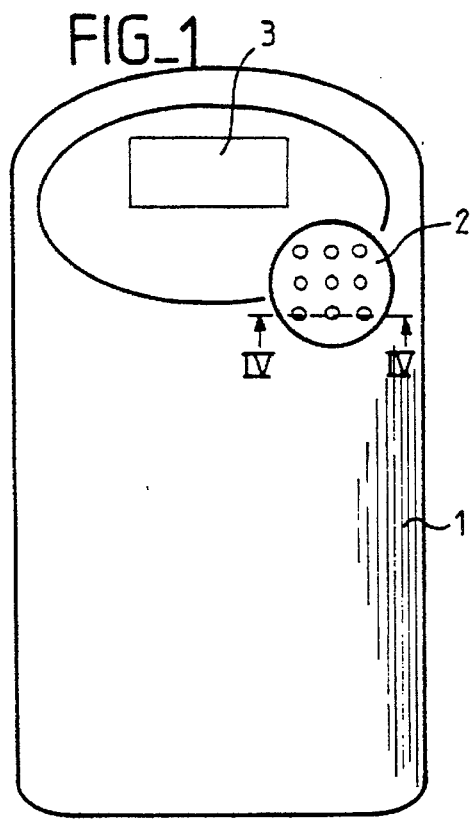
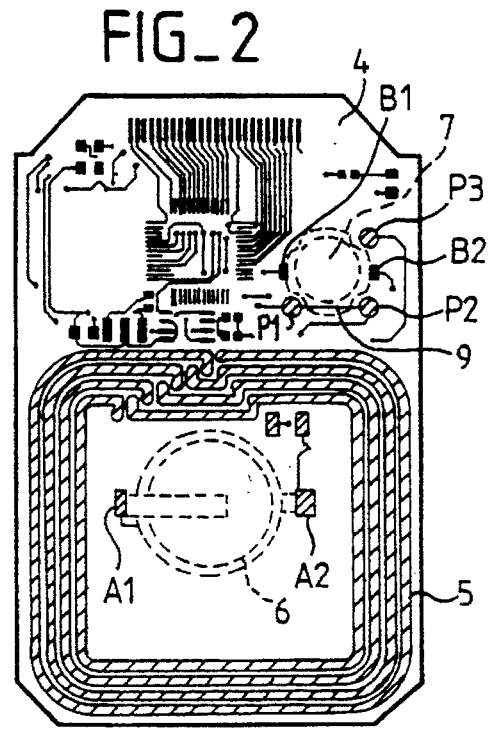
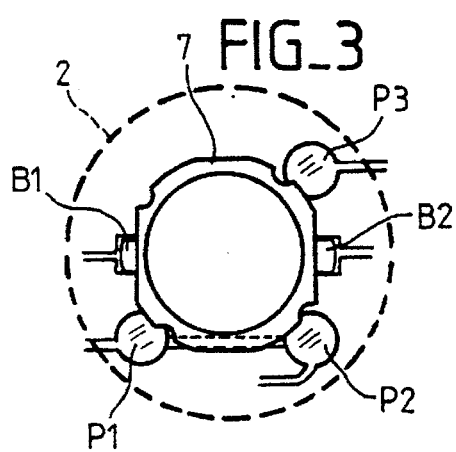
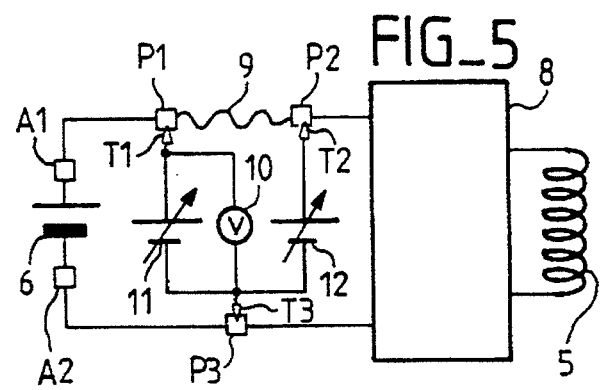
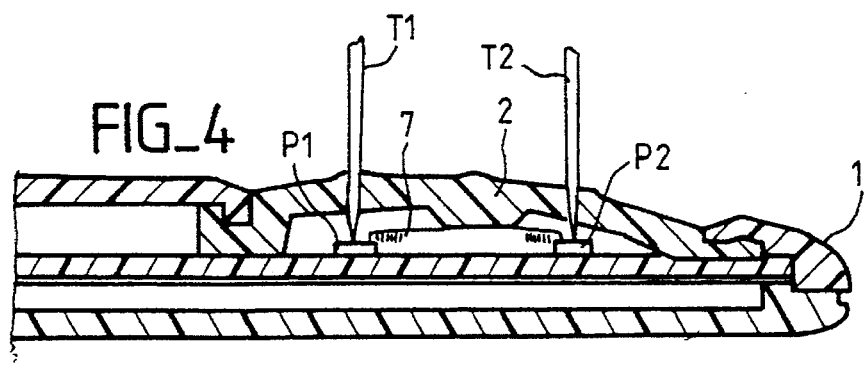

PORTABLE OBJECT INCLUDING AN ELECTRONIC CIRCUIT POWERED BY AN INTERNAL BATTERY AND HAVING A DATA MEMORY, A METHOD AND APPARATUS FOR EXTERNALLY POWERING SAID OBJECT AND FOR TRANSFERRING DATA THEREFROM

The invention relates to a portable object powered by an internal battery and having a data memory.

BACKGROUND OF THE INVENTION

The invention seeks to make the object capable of being powered externally, in particular to give access to the data memory in the event of the internal battery failing or being exhausted. The invention also relates to a method and to apparatus for externally powering such an object.

A particular (but non-limiting) example of an object of this type is a "contactless card" or a "contactless identity badge", i.e. a portable object suitable for interchanging information (by reading and possibly by writing in the data memory of the object) with an external reader by approaching the object thereto in such a manner as to enable electromagnetic coupling without direct contact. Data is then interchanged by radio or by varying a magnetic field produced by an induction coil.

The invention relates to objects powered by an internal battery, particularly objects that are discardable, and thus providing no physical access to the battery by opening a housing or a trap door.

When the battery comes to the end of its life or when it fails, the electronic circuit of the object detects a drop in voltage and warns the user that the end of battery life is near by a visual or audible warning, and then deactivates the electronic circuit to prevent it performing wrongly because of insufficient voltage.

Nevertheless, the data in the memory is conserved and is therefore intact, even though physically inaccessible given that the battery is exhausted so the object is no longer capable of communicating with the external reader—unlike unpowered identity badges, for example, which receive operating power from the reader while they are being read so that they constitute responders that are purely passive. In this situation, data is conserved either because the memory used is non-volatile, or else, more commonly, because the object switches to operating in a "degraded" mode in which, once the near end of battery life has been detected, the remaining energy is used solely for conserving the data in the memory with any external communication being prevented since that would consume too much energy and would imperil the integrity of the data in the memory.

A particular example of such portable objects comprises badges used for remote payment, in particular payment of fares for urban transport, e.g. by bus or by train.

The data memory is loaded with a certain amount of information, e.g. a certain number of units that can be decremented and that correspond to the value of a ride or to a monetary unit, or information relating to weekly, monthly, or annual season tickets.

It will be understood that important information remains in the data memory at the end of battery lifetime and that this information must be recovered in order to ensure the user does not lose any rights, e.g. by transferring the information into a new badge.

It is indeed possible to design a badge that can be opened to allow the battery to be changed. Nevertheless, that operation is difficult given the high degree of circuit miniaturization, and it turns out to be preferable to make badges of that type in the form of an object that has a long lifetime (typically several years), with a housing that is sealed and discardable once the battery is exhausted.

OBJECTS AND SUMMARY OF THE INVENTION

The invention relates to the particular problem of recovering the data contained in such an object by powering it externally for the length of time required to regain access to the data memory but without it being necessary to open up the housing (which can be impossible in practice, e.g. if the housing is sealed).

It is explained below that this external power supply is performed by direct contact, thereby avoiding any need to use complex circuits for delivering power by radio or magnetic energy transmission, which circuits give rise to excess complexity liable to increase the cost of the object which it is desirable to make in very large quantities and at low cost (particularly when the object is discardable).

To this end, the invention provides a portable object of the above-specified type, i.e. comprising an electronic circuit powered by an internal battery and having a data memory, the object being, in particular, of the type that enables data to be interchanged with the outside without making contact, the object including a pierceable zone forming a region of the housing of the object and, inside the housing and facing said pierceable zone, a plurality of contact areas connected to power supply lines for the electronic circuit, said areas being suitable for being put into contact with electrically conductive spikes connected to an external power supply circuit and pushed through the pierceable zone so as to power the electronic circuit of the object, thereby making good any exhaustion or failure of the internal battery, in particular to give access to said data memory.

The plurality of areas includes two areas situated on the same power supply line and separated by a destroyable conductor element so that destruction of said element serves to isolate the exhausted or failed internal battery from the electronic circuit; the destroyable conductor element is a fuse element that is destroyable by passing an electrical current that is considerably greater than the nominal operating current of the electronic circuit.

Advantageously, the pierceable zone is the push face of a pushbutton, and is made of flexible material.

The invention also provides a method of externally powering a portable object as defined above, consisting in: pushing the plurality of electrically conductive spikes through the pierceable zone until said spikes come into contact with the plurality of contact areas in the object; and then applying a voltage between said spikes so as to power the electronic circuit.

When the plurality of contact areas in the object includes two areas situated on a common power supply line and separated by a destroyable conductor element, provision is then made, prior to application of the power supply voltage proper, for a step consisting in destroying the destroyable element, which step is advantageously performed by causing an electrical current that is considerably greater than the nominal operating current of the electronic circuit to pass through the destroyable element via the spikes in contact with the contact areas that are situated on the same power supply line. In which case, prior to destroying the destroyable element, a step may be provided that consists in measuring the voltage across the terminals of the internal battery and in applying the same voltage between said terminals via the spikes, the applied voltage being maintained at least throughout the time during which the element-destroying current is passing.

The invention also provides external power supply and data transfer apparatus designed to co-operate with a portable object as defined above, which apparatus comprises: a plurality of electrically conductive spikes; means for pushing the spikes through a pierceable zone forming a region of the housing of the object until the spikes come into contact with a corresponding plurality of contact areas in the object that are connected to power supply lines of the electronic circuit; means for applying a power supply voltage between the spikes; and means for accessing said data memory.

Advantageously, means are also provided for applying a current to destroy a destroyable element in the object between spikes in contact with contact areas in the object that are situated on the same power supply line; in which case, there may also be provided means for measuring the voltage across the terminals of the internal battery prior to destroying the destroyable element, and means for applying a voltage of the same value across the terminals by means of the spikes and for maintaining said voltage at least throughout the time the means for applying the element-destroying current are active.

BRIEF DESCRIPTION OF THE DRAWINGS

Other characteristics and advantages of the invention appear on reading the following description of an embodiment given with reference to the accompanying drawings.

FIG. 1 is a front view of an example of a portable object to which the teaching of the invention can be applied.

FIG. 2 is a front view of the circuit card inside the object, showing its various conducting areas and tracks.

FIG. 3 is an enlarged view of the FIG. 2 circuit in the vicinity of its pushbutton.

FIG. 4 is a section on a larger scale through the portable object taken on IV—IV of FIG. 1 through the pushbutton, showing how contact is established between the spikes of the apparatus and the conducting areas of the circuit in the object.

FIG. 5 is a circuit diagram of the object and of the external power supply apparatus, showing how the apparatus and the object co-operate.

MORE DETAILED DESCRIPTION

FIG. 1 shows a portable object of the "badge" type as may be used, for example, for remote payment of public transport fares. Externally the badge 1 has a single pushbutton 2 and a display 3.

Internally the badge has an electronic circuit implemented on a card 4 as shown in FIG. 2. The figure shows the conductive tracks only, without the components, which components are, for example, mounted on said card using surface mounting component (SMC) technology and optionally chip-on-board (COB) technology.

In a manner known per se, the electronic circuit comprises a data memory, typically a backed-up random access memory (RAM) or, in a variant, a non-volatile memory of the E²PROM type or the like, a processor circuit, and an analog circuit enabling data to be interchanged with the outside without making contact, e.g. by inductive coupling with a reader that is close to the badge; in FIG. 2, there can be seen a coil 5 suitable for providing such inductive coupling.

The portable object is powered by an internal battery 6 mounted on the circuit between two terminals A1 and A2. The energy delivered by the battery serves to enable data to be processed internally, to control access to the memory, to interchange data with the external reader, and to store data.

The badge is used in very simple manner, by moving it close to a reader. A wireless connection is then established between the badge and the reader. The reader then proceeds to authenticate and recognize the badge and if it is acceptable, the reader performs the corresponding action, e.g. unlocking a turnstile or an access gate, while possibly also decrementing a count unit in the badge memory (if the badge constitutes a season ticket, then the corresponding information is naturally not altered).

The sole purpose of the pushbutton 2 is to switch on the display 3 so as to enable the user to read the information contained in the memory (expiry date, number of units remaining, battery level, etc.), with various different items of information being displayed in succession, for example, on each press of the pushbutton 2.

It may be observed that the badge has no other controls, with access to the memory being entirely under the control of the external reader once communication has been established with the badge.

The badge is advantageously implemented in the form of a housing that is completely sealed or potted, thereby making it possible further to reduce cost and avoid any risk of fraud by disassembling the badge and tampering with the memory.

The badge does not include any external electrical contact since it has its own power supply and since data transmission is performed by a technique of the contactless type.

When the battery voltage drops below a certain threshold, indicating that the end of battery lifetime is near (with this typically occurring after several years), the processor of the circuit locks itself to avoid any mis-operation that could spoil the contents of the data memory, and the energy remaining in the battery is then used solely for maintaining the data ("degraded" mode).

The contents of the memory is thus preserved and it is necessary to be able to read it back, e.g. for the purpose of reloading a new badge with the remaining number of units, the remaining period of validity, etc.

By the invention, this operation can be performed without taking the housing apart and without adding components (which would be necessary if provision were to be made for transmitting power inductively and without making contact).

To this end, contact areas P1, P2, and P3 connected to the power supply lines of the electronic circuit are provided on the printed circuit 4, advantageously in the vicinity of the pushbutton 2.

These areas are situated close to the pushbutton 2 since the outside face of the pushbutton is made of flexible material (an elastomer or the like) that is easily pierced by means of a sharp spike so as to obtain direct electrical contact with the areas P1, P2, and P3.

As can be seen in FIG. 2, and in the enlarged view of FIG. 3, the areas P1, P2, and P3 are situated, for example, at the periphery of the microcontact 7 that is controlled by the pushbutton (and connected to contact areas B1 and B2), thus ensuring that the areas P1, P2, and P3 are all beneath the flexible material of the pushbutton 2 (see also FIG. 4).

FIG. 5 is an electrical circuit diagram showing the various elements: the battery 6 connected to areas A1 and A2, powers the electronic circuit of the badge represented by block 8.

Contact areas P1 and P2 are situated on a first power supply line with a destroyable conductor element 9 being mounted between these two areas P1 and P2.

The destroyable conductor element 9, referred to below as a "fuse" behaves as a normal conductor at the nominal operating current of the electronic circuit, and it is capable of being destroyed by being heated by causing a current to pass through it that is considerably higher than its nominal current, in a manner described below. By way of example, the fuse 9 may be a narrow length of printed circuit track that is appropriately calibrated, as can be seen in FIGS. 2 and 3. If the COB assembly technique is used, the fuse 9 may be a bonding wire, i.e. a conductor wire (e.g. made of aluminum) that is a few micrometers in diameter and that serves to establish connections between contact areas on a chip and contact areas of the circuit on which the chip is directly mounted.

The area P3 is situated on the other power supply line, i.e. on the line that does not include the areas P1 and P2.

The apparatus for externally powering the badge and for recovering the data therefrom (referred to merely as "apparatus" throughout this description) includes a plurality of electrically conductive spikes, in number corresponding to the contact areas P1, P2, and P3 of the badge.

These spikes T1, T2, and T3 are shown diagrammatically in FIG. 5 in contact with respective conductive areas P1, P2, and P3.

In FIG. 4, the appearance of the spikes T1 and T2 can be seen after they have been pushed through the pierceable material (e.g. elastomer) of the pushbutton by some appropriate means (e.g. a support mounted on a lever) until they establish direct electrical contact with the corresponding contact areas P1 and P2 of the badge. While the steps described below are taking place, it is preferable to maintain sufficient thrust on the spikes against the contact areas, e.g. by means of a spring system, to ensure that good contact is obtained with low contact resistance.

The apparatus further includes a voltmeter 10 mounted between the spikes T1 and T3, a first adjustable voltage source 11 likewise mounted between the spikes T2 and T3, and a second adjustable voltage source 12 mounted between the spikes T2 and T3.

The apparatus is used as follows.

Firstly, contact is established between the spikes of the apparatus and the corresponding areas of the badge by pushing the spikes through the material of the pushbutton 2, while the sources 11 and 12 are disconnected or disabled in some other manner.

Thereafter the residual voltage of the battery 6 between areas P1 and P3 is measured using the voltmeter 10.

The two sources 11 and 12 are then adjusted to a value equal to the voltage measured in this way.

Thereafter the voltage of the source 12 is raised progressively, thereby setting up a current flowing round the loop constituted by the source 12, the fuse 9, and the source 1i (whose internal impedance is much less than that of the worn-out battery 6).

By raising the voltage of the source 12 progressively, the current flowing round the loop is caused to rise correspondingly, until the fuse 9 is destroyed. It may be observed that during this step no current flows through the battery 6, thereby avoiding any risk of explosion due to a charging effect under reverse current.

Once the fuse 9 has been destroyed, the battery 6 is entirely disconnected from the electronic circuit 8 and it is then possible to power it quite safely at its nominal operating voltage by adjusting the voltage source 12 to said nominal voltage.

The badge can then be interrogated by a reader of conventional type using a conventional protocol so as to read and recover the data contained in the memory.

It may be emphasized that the above-described procedure makes it possible to disconnect the battery without interrupting the power supply to the electronic circuit of the badge, and this can be particularly advantageous when the battery continues to perform a useful function in spite of its low voltage (i.e. operation in "degraded" mode).

We claim:

1. A portable object containing an electronic circuit powered by an internal battery and having a data memory, the object being, of the type that enables data to be interchanged with the outside without making contact, the object including a pierceable zone forming a region of the housing of the object and, inside the housing and facing said pierceable zone, a plurality of contact areas connected to power supply lines for the electronic circuit, said areas being suitable for being put into contact with electrically conductive spikes connected to an external power supply circuit and pushed through the pierceable zone so as to power the electronic circuit of the object, thereby making good any exhaustion or failure of the internal battery, to give access to said data memory.

2. The portable object of claim 1, in which the plurality of areas includes two areas situated on the same power supply line and separated by a destroyable conductor element so that destruction of said element serves to isolate the exhausted or failed internal battery from the electronic circuit.

3. The portable object of claim 2, in which the destroyable conductor element is a fuse element that is destroyable by passing an electrical current that is considerably greater than the nominal operating current of the electronic circuit.

4. The portable object of claim 1, in which the pierceable zone is the push face of a pushbutton, and is made of flexible material.

5. A method of externally powering a portable object containing an electronic circuit powered by an internal battery and having a data memory, the object being, of the type that enables data to be interchanged with the outside without making contact, said object including a pierceable zone forming a region of the housing of the object, the method consisting in: pushing a plurality of electrically conductive spikes through the pierceable zone until the spikes come into contact with a corresponding plurality of contact areas in the object and connected to power supply lines of the electronic circuit; then applying a voltage between said spikes so as to power the electronic circuit, thereby making good any exhaustion or failure of the internal battery, to provide access to said data memory.

6. The method of claim 5, in which the plurality of contact areas in the object includes two areas situated on a common power supply line and separated by a destroyable conductor element, a step of destroying the destroyable element being provided prior to application of the power supply voltage so as to isolate the exhausted or failed internal battery from the electronic circuit.

7. The method of claim 6, in which the destroying step is performed by causing electrical current to pass through the destroyable element via the spikes in contact with said contact areas situated on a common power supply line, which current is considerably greater than the nominal operating current of the electronic circuit.

8. The method of claim 7, in which there is provided, prior to destroying the destroyable element, a step consisting in measuring the voltage across the terminals of the internal battery and in applying the same voltage between said terminals via the spikes, the applied voltage being maintained at least throughout the time during which the element-destroying current is passing.

9. An external power supply and data transfer apparatus for co-operating with a portable object containing an electronic circuit powered by an internal battery and having a data memory, the object being, of the type that enables data to be interchanged with the outside without making contact, the apparatus comprising:

a plurality of electrically conductive spikes;

means for pushing the spikes through a pierceable zone forming a region of the housing of the object until the spikes come into contact with a corresponding plurality of contact areas in the object that are connected to power supply lines of the electronic circuit;

means for applying a power supply voltage between the spikes; and means for accessing said data memory.

10. The apparatus of claim 9, further including means for applying current suitable for destroying a destroyable element in the object between said spikes that are in contact with contact areas of the object that are situated on a common power supply line.

11. The apparatus of claim 9, further including means for use prior to destroying the destroyable element to measure the voltage across the terminals of the internal battery, and means for applying the same voltage across said terminals via the spikes and for maintaining the applied voltage at least throughout the time said means for applying said element-destroying current are active.

* * * * *